(12) United States Patent
Dvorak et al.

(10) Patent No.: US 6,924,619 B2
(45) Date of Patent: Aug. 2, 2005

(54) CHARGING SYSTEM FOR CHARGING ELECTRONIC DEVICES IN GARMENTS

(75) Inventors: Joseph L. Dvorak, Boca Raton, FL (US); Joseph Patino, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 71 days.

(21) Appl. No.: 10/459,356

(22) Filed: Jun. 11, 2003

(65) Prior Publication Data

US 2004/0251871 A1 Dec. 16, 2004

(51) Int. Cl.$^7$ ............................................. H01M 10/46
(52) U.S. Cl. ...................................................... 320/108
(58) Field of Search ................................. 320/108, 109, 320/116; 363/15, 152; 2/1, 905; 223/1, 85, DIG. 2

(56) References Cited

U.S. PATENT DOCUMENTS 6,096,264 A * 8/2000 Peifer ............................ 422/1

2002/0154518 A1 10/2002 Elferich et al.

* cited by examiner

*Primary Examiner*—Edward H. Tso
(74) *Attorney, Agent, or Firm*—Larry G. Brown

(57) ABSTRACT

A charging system (100) for charging electronic devices. The charging system (100) includes a power distributor (110) and a power receiver (112) in which the power distributor (110) transfers power to the power receiver (112) when the power receiver (112) engages the power distributor (110). The power receiver (112) induces a charging current in an article that is supported by the power receiver (112). The power receiver (112) can include an inductor plate (146) having a first charging coil (148), and the article can be a garment (156) having an embedded electronic device (158). The garment (156) can include a second charging coil (162), and the first charging coil (148) can induce the charging current in the second charging coil (162).

25 Claims, 6 Drawing Sheets

CHARGING SYSTEM FOR CHARGING ELECTRONIC DEVICES IN GARMENTS

CROSS REFERENCE TO RELATED APPLICATIONS (Not Applicable)

BACKGROUND

1. Technical Field

This invention relates in general to electrical charging systems and more particularly, electrical charging systems for charging embedded components.

2. Description of the Related Art

Several companies are currently embedding various types of electronics in articles of clothing. For example, some manufacturers have placed electronic devices such as mobile phones, global positioning system (GPS) trackers and video cameras within jackets or other outerwear. As many of these elements contain their own power sources, e.g., rechargeable batteries, the portion of these devices that contains the power source must be removed from the article of clothing so that the power source can be replenished. Once this portion of the embedded electronic device is removed from the garment, it is typically mounted on an electronic charger until the power source is sufficiently charged.

This process of replenishing power sources, however, suffers from several significant disadvantages. Namely, once a component of the embedded electronic device is removed from the garment for charging, it may be easily lost or misplaced. Moreover, a consumer may find it cumbersome to constantly remove and reinsert such components, which may lead to the electronic device being insufficiently charged for operation. Finally, the frequency with which the component housing the power source must be accessed for charging can lead to increased wear of the fabric that comprises the article of clothing. Thus, what is needed is a charging system that overcomes the drawbacks of the current art but does not lead to a substantial increase in costs or complexity.

SUMMARY OF THE INVENTION

The present invention concerns a charging system for charging electronic devices. The system can include a power distributor and a power receiver in which the power distributor transfers power to the power receiver when the power receiver engages the power distributor. The power receiver induces a charging current in an article that is supported by the power receiver.

In one aspect of the invention, the power receiver can include an inductor plate having a first charging coil, and the article can be a garment having an embedded electronic device. In addition, the garment can include a second charging coil and the first charging coil can induce the charging current in the second charging coil. The second charging coil and the electronic device can be electrically coupled, and the charging current induced in the second charging coil can charge a power source of the electronic device.

In another arrangement, the power receiver can include an inductor plate having a charging coil, a body in which the body can be attached to the inductor plate, a stem rotatably coupled to the body and at least one power contact protruding from the stem. Also, the power contact can include at least a portion of a first wire and at least a portion of a second wire in which the portions of the first wire and the second wire that protrude from the stem are exposed.

In yet another arrangement, the power distributor can include a power strip, and the power strip can have at least one positive power strip and at least one negative power strip. When the power receiver engages the power distributor, at least one of the exposed portions of the first wire and the second wire can contact the positive power strip, and a remaining one of the exposed portions of the first wire and the second wire can contact the negative power strip. At least a portion of the first wire and the second wire can be housed within the stem and the body, and the first wire and the second wire can be electrically coupled to the charging coil of the inductor plate. Thus, a circuit can be completed between the charging coil of the inductor plate and the power strip when the power receiver engages the power distributor.

In another aspect, the power receiver can further include a switch for controlling the flow of current through the circuit. The switch can be closed when the article is supported by the power receiver and can be opened when the article is removed from the power receiver.

The power strip can be disposed on an inner surface of the power distributor. In another embodiment, a section of insulation can be disposed on an inner surface of the power distributor, and the power strip can be disposed on a surface of the section of insulation. Additionally, the power distributor can include a channel running substantially along the power distributor in which the channel can receive the power receiver to permit the power receiver to engage the power distributor. The power distributor can also include a wall mount for securing the power distributor to a wall.

The present invention also concerns a charging system having a power distributor and a garment hanger for supporting a garment. The power distributor transfers power to the garment hanger when the garment hanger electrically engages the power distributor. In addition, the garment hanger includes an inductor plate having a charging coil for inducing a charging current in another charging coil embedded in a garment supported by said garment hanger when said garment hanger electrically engages said power distributor.

The present invention also concerns another charging system. This charging system includes a power distributor and a power receiver having at least a first coupling. The power distributor transfers power to the power receiver when the power receiver engages the power distributor. The first coupling is coupled to an article that is supported by the power receiver and the power receiver transfers the power through the first coupling to the article. In one arrangement, the article can include a second coupling for electrically engaging the first coupling.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
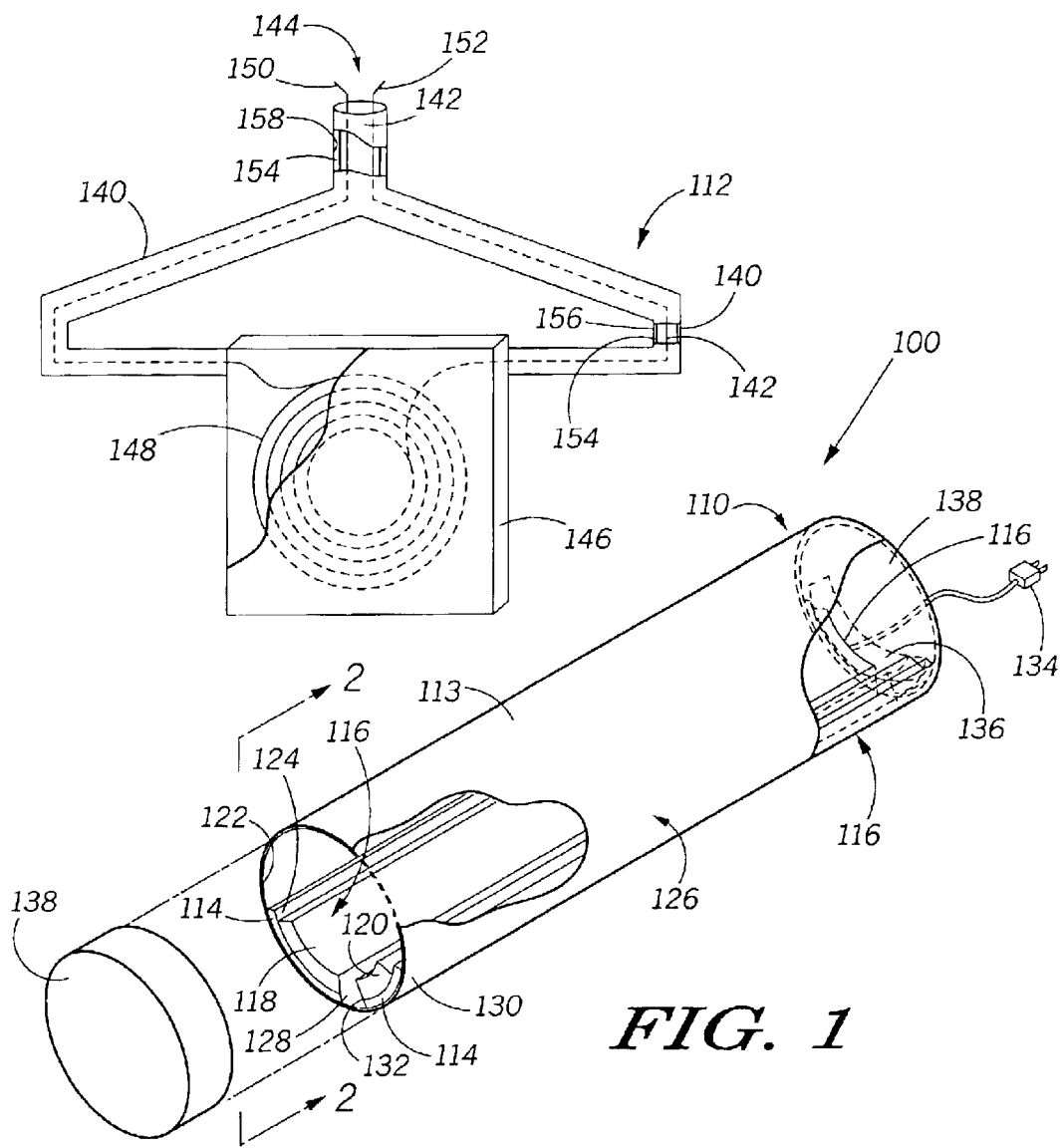
FIG. 1 illustrates a charging system in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a charging system 100 in accordance with the inventive arrangements is shown. The charging system 100 can include a power distributor 110 and a power receiver 112. As will be explained in detail below, the power receiver 112 can be engaged with the power distributor 110, and the power distributor 110 can distribute or transfer power to the power receiver 112. Several portions of the power distributor 110 are cut away to show sections of its inner structure, which will be discussed later. In one arrangement, the power distributor 110 can be an elongated structure, such as a rod. It is understood, however, that the power distributor 110 can be any other suitable shape, so long as it is capable of providing power to the power receiver 112.

In another arrangement, the power receiver 112 can be a structure that can receive and support a wide variety of articles. As an example, the power receiver 112 can be in the shape of a garment hanger, which can permit the power receiver 112 to support many different types of clothing. Of course, the power receiver 112 is not limited to this example, as the power receiver 112 can be any other suitable shape and can support any other suitable article, so long as it is capable of engaging the power distributor 110 and receiving power from the power distributor 110.

In accordance with the inventive arrangements, when the power receiver 112 is engaged with the power distributor 110, the power transferred to the power receiver 112 can be used to charge electronic devices embedded within, for example, an article of clothing that the power receiver 112 has received and is supporting. It is understood, however, that the invention is not limited to this particular example, as the charging system 100 can charge other suitable devices.

Figure 2:
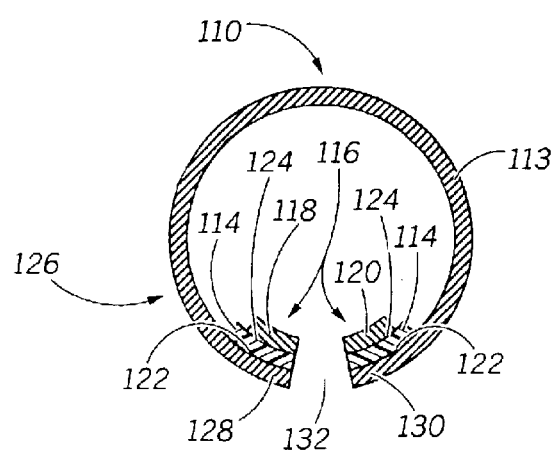
FIG. 2 illustrates an end view of power distributor looking along reference line 2—2 of FIG. 1 in accordance with the inventive arrangements.

Referring to FIG. 2, an end view of the power distributor 110 is shown in which the direction of sight follows the reference line 2—2 of FIG. 1. The power distributor 110 will be further discussed in relation to FIGS. 1 and 2. In one arrangement, the power distributor 110 can include a body 113, a section of insulation 114 and at least one power strip 116. The power strip 116 can include at least one positive power strip 118 and at least one negative power strip 120. The power strip 116 can serve as an electrical distribution strip in which the positive power strip 118 can carry a positive charge, and the negative power strip 120 can be a ground terminal.

In addition, the insulation 114 can be disposed on an inner surface 122 of the body 113, and the power strip 116 can be disposed on a surface 124 of the insulation 114. Although FIGS. 1 and 2 illustrate the insulation 114 and the power strip 116 as being primarily situated in a lower section 126 of the body 113, it is understood that the invention is not so limited; the insulation 114 and the power strip 116 can be disposed at other suitable locations associated with the power distributor 110.

Figure 3:
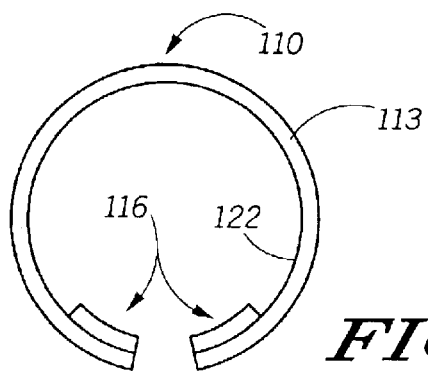
FIG. 3 illustrates an end view of another power distributor in accordance with the inventive arrangements.

It is not necessary for the power distributor 110 to include the insulation 114. For example, the body 113 can be constructed of a non-conductive material, and the power strip 116 can be disposed on the inner surface 122 of the body 113. An example of this arrangement is illustrated in FIG. 3.

Figure 4:
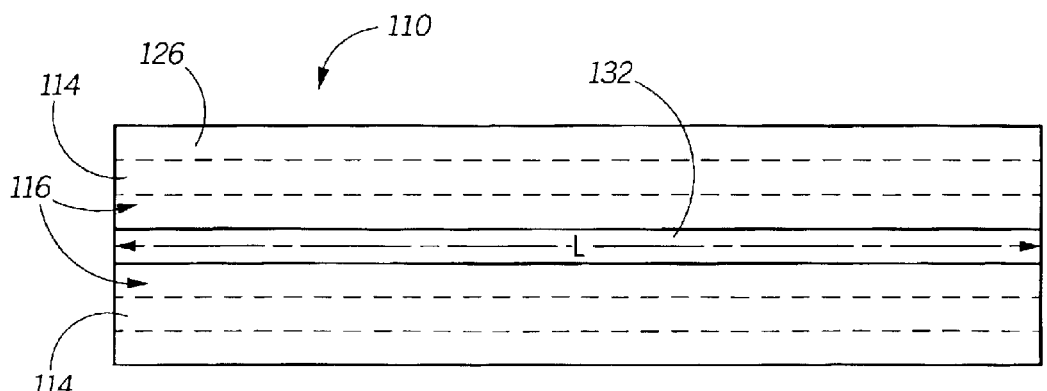
FIG. 4 illustrates a bottom view of the power distributor of FIG. 2 in accordance with the inventive arrangements.

Referring back to FIGS. 1 and 2, in one embodiment, the body 113 can be substantially circular and can include ends 128, 130, which preferably do not come into contact (the ends 128, 130 can extend along at least a portion of the length of the power distributor 110). As a result, a channel 132 can be formed between the ends 128, 130. The channel 132 can separate the positive power strip 118 and the negative power strip 120. As an example, the positive power strip 118 can be disposed on the insulation 114 that is on the end 128 of the body 113, and the negative power strip 120 can be mounted on the insulation 114 that is on the end 130. Of course, the positive power strip 118 and the negative power strip 120 can be positioned on either end 128, 130. In one arrangement, the channel 132 can traverse along at least a substantial portion of the lower section 126 of the power distributor 110. Referring to FIG. 4, a bottom view of an example of a power distributor 110 having a channel 132 that runs along a longitudinal axis L of the lower section 126 of the power distributor 110 is illustrated (for reference, the insulation 114 and the power strip 116 are also shown).

Referring back to FIG. 1, the power distributor 110 can include a plug 134 for receiving power from an electrical distribution network (not shown). As an example, the electrical distribution network can be the electrical system in a residence or a commercial establishment. In another arrangement, the power distributor 110 can include a power converter 136 for either increasing or decreasing the voltage of the electrical distribution network. For example, the power converter 136 can be a step-down transformer that can receive an AC voltage and decrease the magnitude of the AC voltage to a suitable level. The power converter 136 can be coupled to the power strip 116, as shown in FIG. 1. Of course, the power distributor 110 is not required to include the power converter 136 or any other device for modifying the magnitude of the voltage.

As also shown in FIG. 1, the body 113 of the power distributor 110 can include one or more end caps 138. An end cap 138 can be mounted on each end of the body 113 thereby insulating the power distributor 110 from the outside environment, except for the channel 132. In one embodiment, the length of the power strip 116 can be slightly shorter than the length of the insulation 114 to prevent the power strip 116 from contacting the end caps 138. In another arrangement, the end caps 138 can be constructed of a non-conductive material, in which case the length of the power strip 116 can be shorter than, equal to or even longer than the length of the insulation 114, if the insulation 114 is even present.

As noted earlier, the charging system 100 can include a power receiver 112, which, when engaged with the power distributor 110, can receive power from the power distributor 110. As illustrated in FIG. 1, the power receiver 112 can include a body 140, a stem 142 coupled to the body 140, a power contact 144 that protrudes from the stem 142 and an inductor plate 146. The stem 142 can be rotatably coupled to the body 140. Further, the inductor plate 146 can include a charging coil 148 (a portion of the inductor plate 146 is cut away to show the charging coil 148).

In one arrangement, the power contact 144 can include at least a portion of a first wire 150 and at least a portion of a second wire 152. When the power receiver is engaged with the power distributor 110, the first wire 150 and the second wire 152 can be in contact with the power strip 116. Both portions of the first wire 150 and the second wire 152 that protrude from the stem 142 can be exposed to the outside environment. The exposed portions of the first wire 150 and the second wire 152 can be bent at angle, which can facilitate their contact with the power strip 116. It is understood, however, that the invention is not limited to the particular power contact 144 described above, as the power contact 144 can be any suitable structure for contacting the power strip 116.

Another portion of the first wire 150 and the second wire 152 (represented by the broken lines) can be housed within the body 140 and the stem 142, and this portion of the first wire 150 and the second wire 152 can be electrically coupled to the charging coil 148 of the inductor plate 146. In one arrangement, insulation 154 can be disposed on an inner surface 156 of the body 140 and on an inner surface 158 of the stem 142 (see the cut away portions of the power receiver 112).

To illustrate the operation of the charging system 100, reference will be made to FIGS. 1, 2 and 4. Power can be supplied to the power distributor 110. For example, the plug 134 can be inserted into a standard electrical outlet for receiving power from an electrical distribution network. The power converter 136 can provide a stepped-down AC voltage to the power strip 116 such that a potential exists between the positive power strip 118 and the negative power strip 120.

A user can grasp the power receiver 112 and can engage the power receiver 112 with the power distributor 110. Specifically, the user can twist the stem 142 until the bent portions of the first wire 150 and the second wire 152 are at least substantially aligned with or parallel to the longitudinal axis L. The user can then insert the first wire 150 and the second wire 152 through the channel 132. Once inserted, the user can twist the stem 142 until the bent portions of the first wire 150 and the second wire 152 are at least substantially perpendicular to the longitudinal axis L. The user can then release the stem 142, and the weight of the power receiver 112 will ensure that the first wire 150 and the second wire 152 contact the power strip 116.

Figure 5:
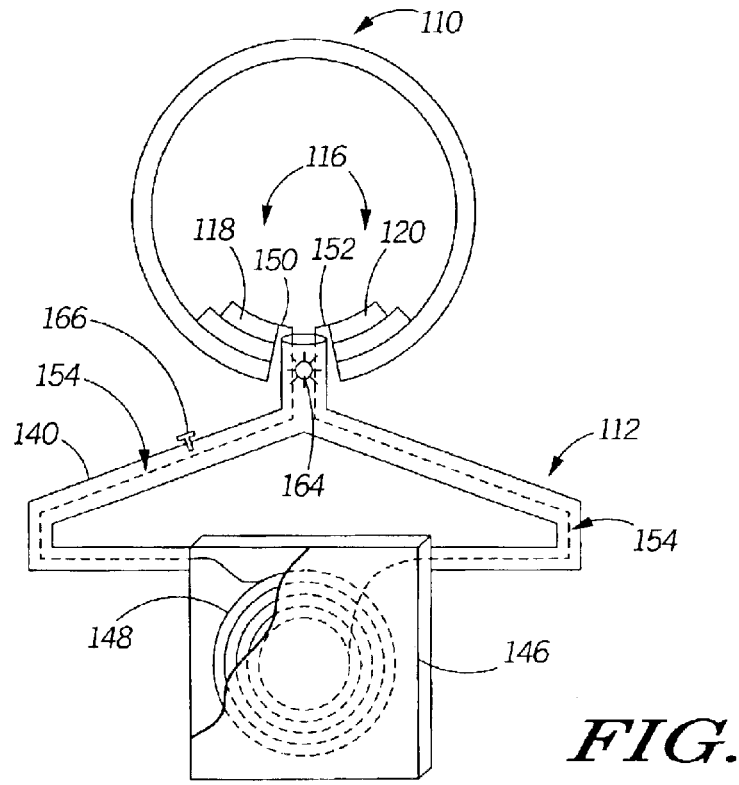
FIG. 5 illustrates a power receiver engaged with the power distributor of FIG. 2 in accordance with the inventive arrangements.

It is irrelevant as to which wire 150, 152 contacts the positive power strip 118 and the negative power strip 120. That is, one of the exposed portions of either the first wire 150 or the second wire 152 can contact the positive power strip 118, and the remaining one of the exposed portions of the first wire 150 or the second wire 152 can contact the negative power strip 120. An example of the power receiver 112 engaged with the power distributor 110 is shown in FIG. 5. It is understood that the invention is not limited to the arrangement illustrated in FIG. 5 in which the first wire 150 and the second wire 152 are engaged with the positive power strip 118 and the negative power strip 120, respectively; the first wire 150 may also be engaged with the negative power strip 120 while the second wire 152 is engaged with the positive power strip 118.

When the first wire 150 and the second wire 152 are in contact with the power strip 116, a circuit 154 is completed between the charging coil 148 of the inductor plate 146 and the power strip 116. When the circuit 154 is completed, a current, such as an AC current, can flow through the circuit 154. Those of ordinary skill in the art will appreciate that the charging system 100 can be constructed to permit a pulsed DC current to flow through the circuit 154 as well.

Figure 6:
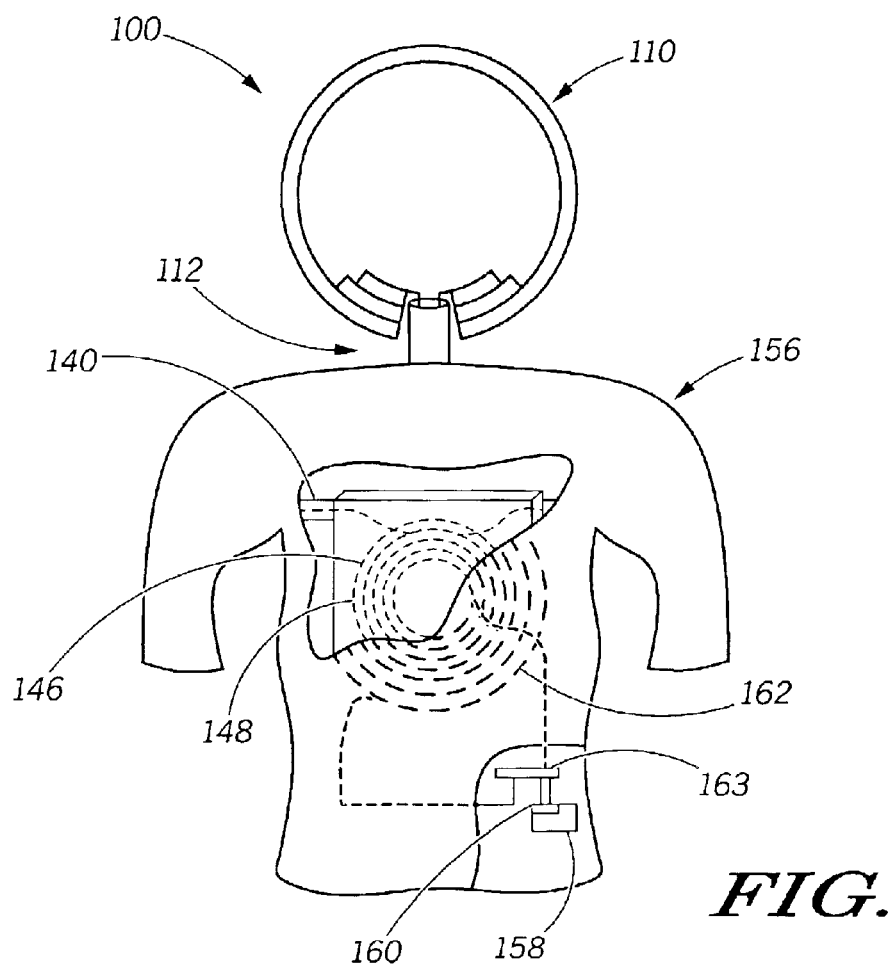
FIG. 6 illustrates the power receiver of FIG. 5 engaged with the power distributor of FIG. 2 in which the power receiver is supporting a garment in accordance with the inventive arrangements.

In one arrangement, the power receiver 112 can be used to support a wide variety of garments. For example, referring to FIG. 6, the power receiver 112 can be used to support a garment 156, such as a jacket, that can include one or more embedded electronic devices 158. A portion of the garment 156 has been cut away to show part of the following components of the power receiver: the body 140, the inductor plate 146 and the charging coil 148. Merely for illustrative purposes and not intended to limit the invention in any way, the electronic device 158 can be a mobile phone, a radio, a camera or a GPS tracker. As an example and as explained earlier, the power receiver 112 can be in the shape of a conventional clothes hanger. Thus, in this embodiment, to support the garment 156, the garment 156 can be slipped onto the power receiver 112 in a fashion similar to the process of placing an article of clothing on a conventional clothes hanger.

In one arrangement, the electronic device 158 can include a power source 160, and the garment 156 can include a second charging coil 162. The power source 160 can be a replenishable power source, such as one or more rechargeable batteries, and the second charging coil 162 can be electrically coupled to the power source 160. A rectifier 163 for converting the charging current to a DC current can be placed between the second charging coil 162 and the power source 160, if needed.

As noted earlier, when the power receiver 112 is engaged with the power distributor 110, an AC current can flow through the charging coil 148 of the inductor plate 146. Thus, when the power receiver 112 is supporting, for example, the garment 156 and the garment 156 includes the second charging coil 162, the charging coil 148 can induce a charging current in the second charging coil 162. This charging current can be used to recharge or replenish the power source 160 of the electronic device 158. As a result, a user may charge, for example, electronic devices embedded in an article, such as a garment, that is supported by the power receiver 112 when the power receiver 112 is engaged with the power distributor 110. It must be noted, however, that the power receiver 112 is not limited to supporting articles of clothing, as the power receiver 112 can support any suitable article that may or may not include one or more embedded electronic devices.

In another arrangement and referring back to FIG. 5, the power receiver 112 may include an LED 164, which can illuminate if the power receiver 112 is properly engaged with the power distributor 110. In one arrangement, the LED 164 can be coupled to any suitable portion of either the first wire 150 or the second wire 152, through a rectifier if so desired. This illumination can serve as an indication to a user that the first and second wires 150, 152 are in proper contact with the power strip 116. The LED 164 may also be mounted on the power distributor 110.

Remaining with FIG. 5, the power receiver 112 may also include a switch 166 for controlling the flow of current through the circuit 154. The switch 166 may be coupled to any suitable portion of the circuit 154. In one embodiment, referring to FIGS. 5 and 6, the switch 166 can be pressure sensitive such that when an article, such as the garment 156, is placed on the body 140 of the power receiver 112, the switch 166 may close thereby permitting current to flow through the circuit 154. Conversely, when the article, e.g., the garment 156, is removed from the power receiver 112, the switch 166 may open, which prevents current from flowing through the circuit 154.

Figure 7:
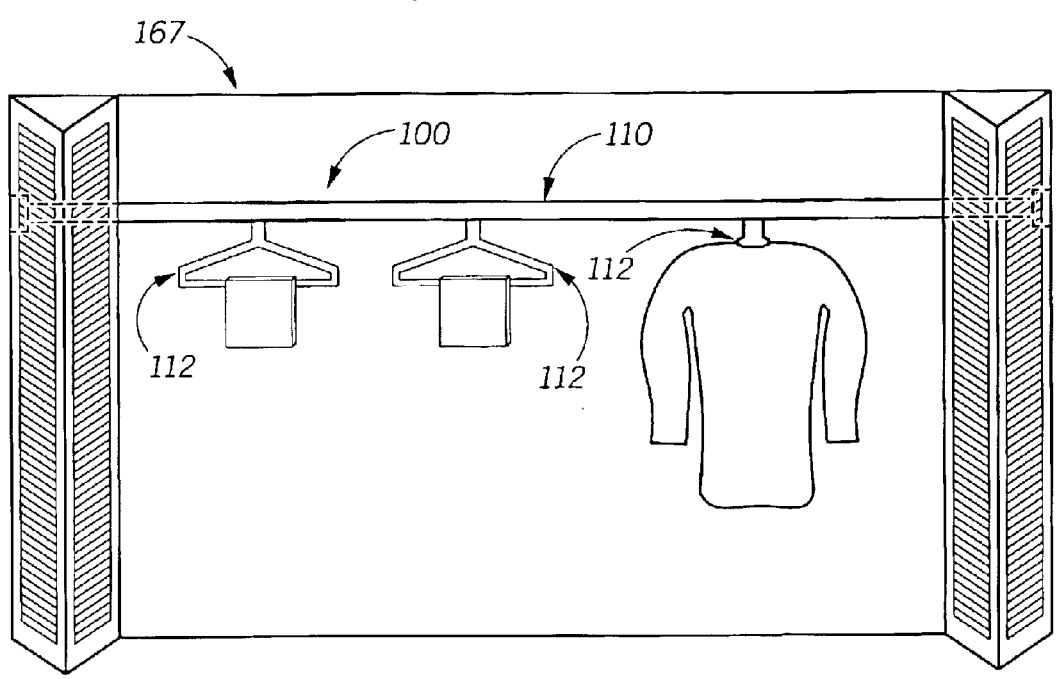
FIG. 7 illustrates the power distributor of FIG. 2 mounted in a closet in accordance with the inventive arrangements.

Referring to FIG. 7, an example of an application for mounting the power distributor 110 is shown. In this example, the power distributor 110 can be mounted in a closet 167 and can serve a function similar to that of a conventional closet rod or bracket. The power distributor 110 can be any suitable length and can support any suitable number of power receivers 112, which can permit a user to charge and/or support any suitable number of articles. Of course, the invention is not limited to being mounted in a closet, as the charging system 100 can be disposed in any other suitable location.

Figure 8:
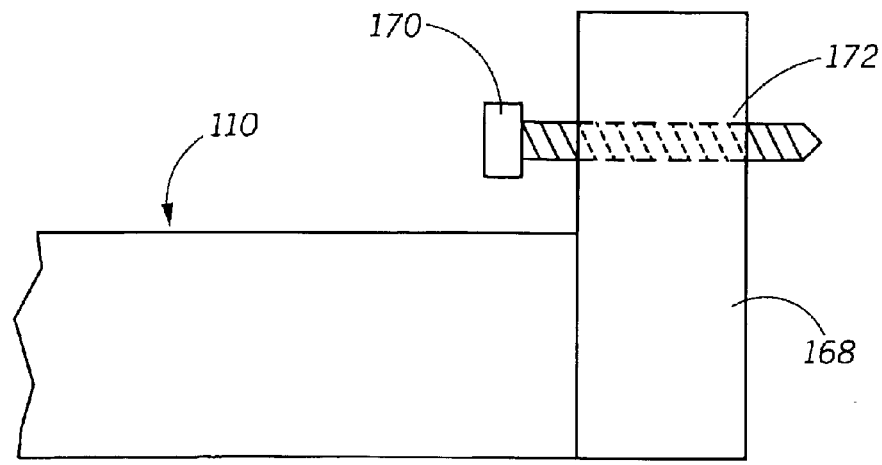
FIG. 8 illustrates another example of the power distributor of FIG. 2 in accordance with the inventive arrangements.

Referring to FIG. 8, the power distributor 110 can include one or more wall mounts 168. The wall mounts 168 can include a fastener 170 and an aperture 172, through which the fastener 170 may be inserted. As an example, the fastener 170 can be a screw or a nail. As such, these wall mounts 168 can be used to secure the power distributor 110 to a wall or any other surface.

Figure 9:
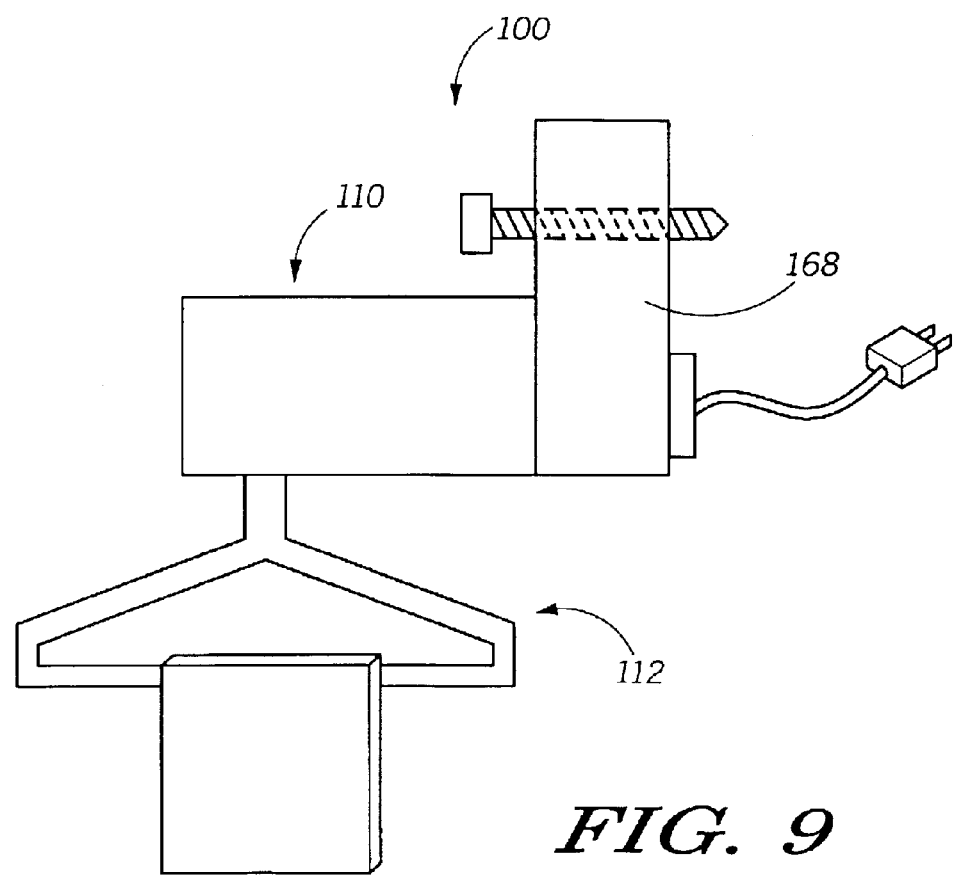
FIG. 9 illustrates yet another example of the power distributor of FIG. 2 in accordance with the inventive arrangements.

Referring to FIG. 9, an example of a charging system 100 in accordance with the inventive arrangements is shown. Here, the charging system 100 can include all the elements previously described above except that the power distributor 110 can be relatively short. As an example, the power distributor 110 can be only long enough to support a limited number of power receivers 112, e.g., one or two power receivers 112. The power distributor 110 can include a wall mount 168 for securing the power distributor 110 to, for example, a wall. This particular arrangement operates in accordance with the description above; however, using a shorter power distributor 110 may increase the number of locations where a user can place or use the charging system 100.

Figure 10:
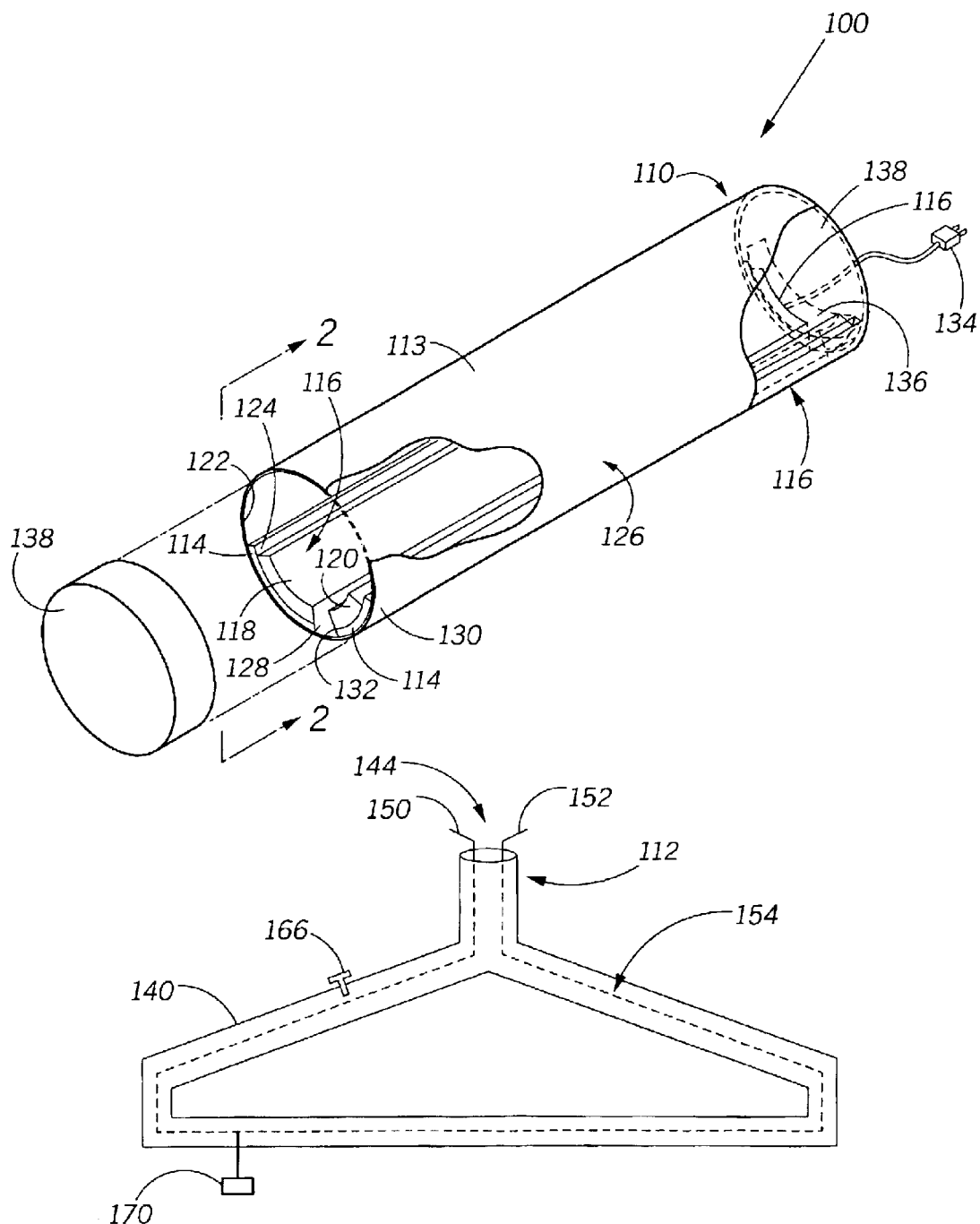
FIG. 10 illustrates another example of a charging system in accordance with the inventive arrangements.

Referring to FIG. 10, an alternative embodiment of the present invention is illustrated. In this arrangement, the power distributor 110 can be similar to the embodiments previously described. In addition, the power receiver 112 can include all or at least a portion of the features described in relation to previous embodiments. For example, the power receiver 112 can include the switch 166. In this example, however, the power receiver 112 can include at least one first coupling 170, which can be coupled to the circuit 154. Here, the power receiver 112 can receive power from the power distributor 110 and can transfer this power to the first coupling 170.

Figure 11:
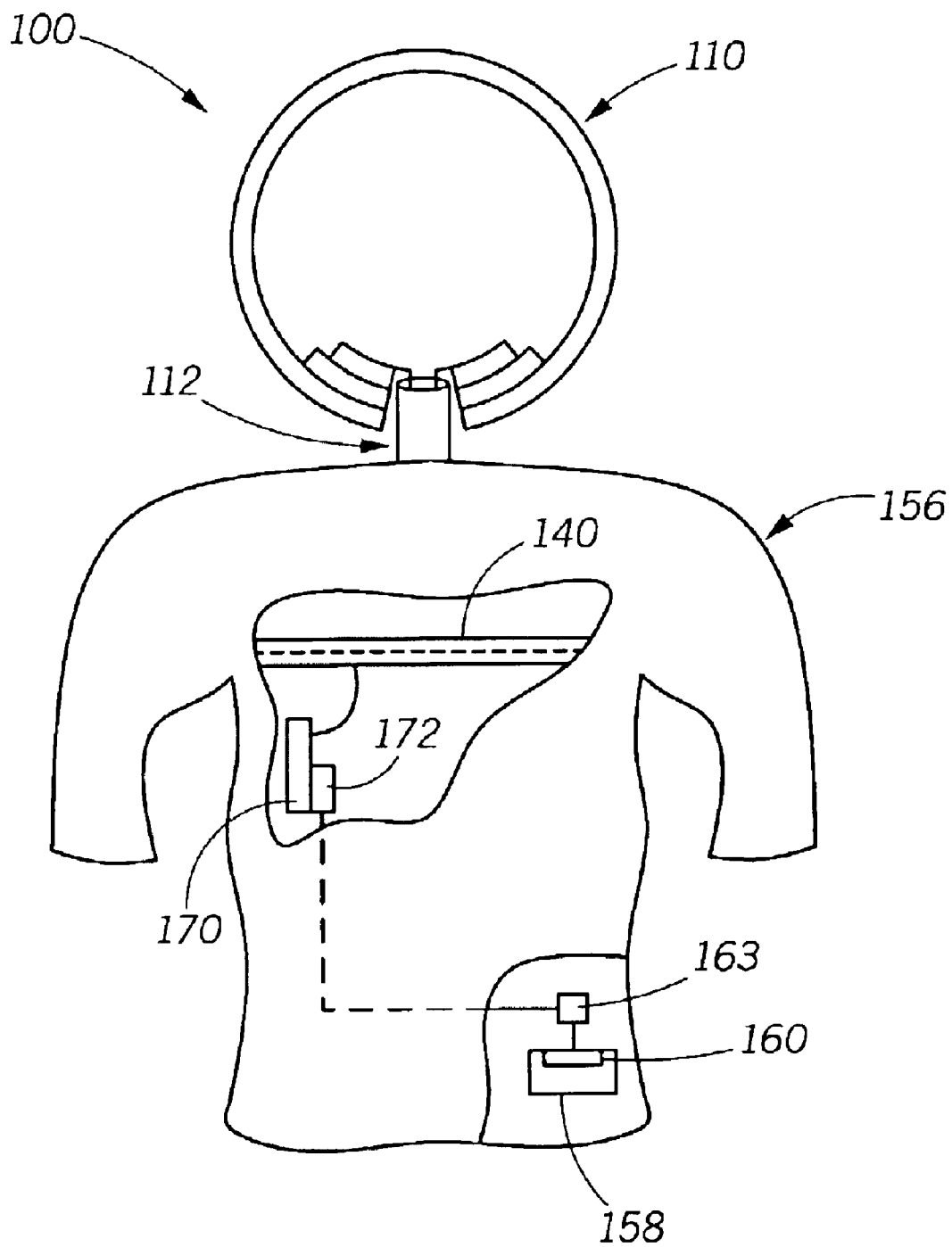
FIG. 11 illustrates an article being charged by the charging system of FIG. 10 in accordance with the inventive arrangements.

Referring to FIG. 11, the power receiver 112 can support a garment 156 having one or more embedded electronic devices 158. As shown, the garment 156 can include a second coupling 172, which can be coupled to a power source 160 of the electronic device 158. Both the first coupling 170 and the second coupling 172 can include any suitable structure for permitting the first coupling 170 and the second coupling 172 to electrically engage one another. As a result, the power receiver 112 can transfer power through the first coupling 170 and the second coupling 172 to charge the power source 160 of the electronic device 158. In this arrangement, the power receiver 112 can receive either DC or AC from the power distributor 110, and, if desired, the power distributor 110 can reduce the magnitude of the voltage that it receives. If the power receiver 112 receives DC, it may not be necessary for the garment 156 to include a rectifier, such as rectifier 163.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A charging system for charging electronic devices, comprising:
   a power distributor; and
   a power receiver, wherein said power distributor transfers power to said power receiver when said power receiver engages said power distributor;
   wherein said power receiver induces a charging current in a garment that is supported by said power receiver, wherein the garment has an embedded electronic device.

2. The system according to claim 1, wherein said power receiver comprises an inductor plate having a first charging coil, wherein the garment includes a second charging coil and wherein said first charging coil induces the charging current in the second charging coil.

3. The system according to claim 2, wherein the second charging coil and the electronic device are electrically coupled and wherein the charging current induced in the second charging coil charges a power source of the electronic device.

4. The system according to claim 1, wherein said power receiver comprises an inductor plate having a charging coil, a body, said body being attached to said inductor plate, a stem rotatably coupled to said body and at least one power contact protruding from said stem.

5. The system according to claim 4, wherein said power contact comprises at least a portion of a first wire and at least a portion of a second wire, wherein said portions of said first wire and said second wire that protrude from said stem are exposed.

6. The system according to claim 5, wherein said power distributor includes a power strip, said power strip including at least one positive power strip and at least one negative power strip.

7. The system according to claim 6, wherein said power strip is disposed on an inner surface of said power distributor.

8. The system according to claim 6, wherein a section of insulation is disposed on an inner surface of said power distributor and said power strip is disposed on a surface of said section of insulation.

9. The system according to claim 6, wherein when said power receiver engages said power distributor, at least one of said exposed portions of said first wire and said second wire contacts said positive power strip and a remaining one of said exposed portions of said positive wire and said negative wire contacts said negative power strip.

10. The system according to claim 9, wherein at least a portion of said first wire and said second wire are housed within said stem and said body, said first wire and said second wire being electrically coupled to said charging coil of said inductor plate, whereby a circuit is completed between said charging coil of said inductor plate and said power strip when said power receiver engages said power distributor.

11. The system according to claim 10, wherein said power receiver further comprises a switch for controlling the flow of current through said circuit.

12. The system according to claim 11, wherein said switch is closed when the garment is supported by said power receiver and opened when the garment is removed from said power receiver.

13. The system according to claim 1, wherein said power distributor comprises a channel running substantially along said power distributor, wherein said channel receives said power receiver to permit said power receiver to engage said power distributor.

14. The system according to claim 1, wherein said power distributor comprises a wall mount for securing said power distributor to a wall.

15. A charging system, comprising:
a power distributor; and
a power receiver, wherein said power distributor transfers power to said power receiver when said power receiver engages said power distributor;
wherein said power receiver includes an inductor plate having a charging coil for inducing a charging current in another charging coil in a garment having an embedded electronic device when said power receiver engages said power distributor.

16. A charging system, comprising:
a power distributor; and
a garment hanger for supporting a garment, said power distributor transfers power to said garment hanger when said garment hanger electrically engages said power distributor;
wherein said garment hanger includes an inductor plate having a charging coil for inducing a charging current in another charging coil embedded in a garment supported by said garment hanger when said garment hanger electrically engages said power distributor.

17. A power receiver of a charging system, comprising:
an inductor plate having a first charging coil;
a body, said body being attached to said inductor plate; and
a stem coupled to said body and at least one power contact protruding from said stem, wherein said power receiver induces a charging current in a garment that is supported by said power receiver, wherein the garment has an embedded electronic device.

18. The power receiver according to claim 17, wherein said power contact comprises at least a portion of a first wire and at least a portion of a second wire, wherein said first wire and said second wire that protrude from said stem are exposed.

19. The power receiver according to claim 18, wherein at least a portion of said first wire and said second wire are housed within said stem and said body, said first and said second wire being electrically coupled to said first charging coil of said inductor plate, whereby a circuit is completed between said first charging coil of said inductor plate and a power strip of a power distributor when said power receiver engages the power distributor.

20. The power receiver according to claim 19, further comprising a switch for controlling flow of current through said circuit and wherein said stem is rotatably coupled to said body.

21. A power distributor of a charging system, comprising:
a power strip; and
a channel, wherein said power strip includes at least one positive power strip and at least one negative power strip, wherein said power distributor transfers power to a power receiver when the power receiver engages said power distributor through said channel, whereby in response, the power receiver induces a charging current in a garment that is supported by the power receiver, wherein the garment has an embedded electronic device.

22. The power distributor according to claim 21, wherein a section of insulation is disposed on an inner surface of said power distributor and said power strip is disposed on a surface of said section of insulation.

23. The power distributor according to claim 21, wherein said channel runs substantially along said power distributor.

24. The power distributor according to claim 21, further comprising a wall mount for securing said power distributor to a wall.

25. A method for charging electronic components, comprising the steps of:
engaging a power distributor with a power receiver;
transferring power from the power distributor to the power receiver;
inducing a charging current in a garment that is supported by the power receiver; and
charging with the induced charging current a power source embedded within the garment that is supported by the receiver.

* * * * *